United States Patent
Maughan et al.

(10) Patent No.: US 6,298,570 B1
(45) Date of Patent: Oct. 9, 2001

(54) GAGE ASSEMBLY AND METHOD

(75) Inventors: Garth Maughan, Delta; Frank Lucienne, Toledo, both of OH (US); Lani Morrison, Leslie, MI (US); Greg Fleniken, Toledo, OH (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/470,349

(22) Filed: Dec. 22, 1999

(51) Int. Cl.[7] ....................................................... G01B 3/34
(52) U.S. Cl. .............................. 33/517; 33/549; 403/122; 384/206
(58) Field of Search ..................................... 33/1 BB, 517, 33/501.05, 501.08, 501.45, 549, 567, 567.1, 502; 403/122, 132, 135, 137, 141, 142, 143; 248/181.1, 288.31, 288.51; 384/245, 209, 210, 192, 206

(56) References Cited

U.S. PATENT DOCUMENTS

| | | | |
|---|---|---|---|
| 1,335,247 | * | 3/1920 | Lask ......................................... 33/567 |
| 1,446,645 | * | 6/1923 | Hanson .............................. 33/501.05 |
| 1,469,343 | * | 9/1923 | Strong ................................. 33/501.05 |
| 1,516,124 | * | 7/1924 | Schlaupitz .......................... 33/501.05 |
| 1,533,369 | * | 7/1925 | Blood .................................. 33/501.05 |
| 2,345,591 | * | 10/1944 | Frederick ................................ 33/567 |
| 3,146,528 | * | 9/1964 | Goulet et al. ........................... 33/517 |
| 3,242,579 | | 3/1966 | Cermenaro et al. . |
| 3,486,235 | * | 12/1969 | Meyers et al. ..................... 33/501.05 |
| 3,570,796 | * | 3/1971 | Capps ................................. 33/501.05 |
| 3,736,665 | | 6/1973 | La Moreux . |
| 3,736,816 | | 6/1973 | McAfee . |
| 3,817,640 | | 6/1974 | Carter et al. . |
| 4,576,499 | | 3/1986 | Smith . |
| 4,790,079 | * | 12/1988 | Meyers .................................... 33/517 |
| 5,038,600 | * | 8/1991 | Friedman .............................. 33/502 |
| 5,101,573 | | 4/1992 | Mills et al. . |
| 5,259,120 | * | 11/1993 | Chapman et al. ..................... 33/502 |

FOREIGN PATENT DOCUMENTS 05-482-15 * 9/1942 (GB) ..................................... 33/178

* cited by examiner

Primary Examiner—Diego Gutierrez
Assistant Examiner—Maria Fernandez
(74) Attorney, Agent, or Firm—Rader, Fishman & Grauer PLLC

(57) ABSTRACT

A gage device and a test system for statistically qualifying compliant or semi-rigid molded bearings and bearing sets to predetermined material conditions includes a gage body, a flanged plug, a stud used to set a first predetermined material condition, an adapter used to set a second predetermined material condition, and a test fixture. The device simulates the assembly of ball joints to determine whether molded conformal bearings or bearing sets are acceptable from a beginning of life perspective. In this way, functional acceptability of a given number of samples drawn from a production lot is proven to satisfy pre-determined maximum and minimum material conditions. A method of testing and statistically qualifying the bearings is also disclosed.

18 Claims, 3 Drawing Sheets

GAGE ASSEMBLY AND METHOD

FIELD OF THE INVENTION

The present invention generally relates to an inspection gage. More particularly, the present invention relates to a gage assembly that is suitable for inspecting compliant or conformal bearings or bearing sets used in vehicular ball and socket joints, non-articulating joints and similar industrial applications. The present invention also includes a method for inspecting compliant or conformal bearings.

BACKGROUND OF THE INVENTION

Traditional methods for dimensionally inspecting injection or compression molded compliant or conformal bearings or bearing sets for use in ball joints can be complex, time-consuming, and inefficient. In particular, after parts are removed from the molds, the parts tend to deform slightly as they cool. With respect to compliant bearings, the deformation is self-correcting upon installation, because the bearing is designed to be "compliant" and to properly "conform" to the surfaces on which it is installed due to the force of installation.

Nevertheless, short of direct installation, it is difficult to know whether a particular bearing is acceptable for use. Current methods for inspecting conformal or compliant bearings generally involve extensive manual measurement of bearing dimensions. However, since the bearing typically deforms as it cools, the actual shape of the uninstalled bearing will be significantly different than the shape the bearing takes after installation. As a result, various complex methodologies have been developed to reconcile pre-installed bearing dimensional measurements, i.e. including bearing deformation, with performance of the bearing after installation. However, as bearing material becomes more compliant and as designs change, it is often impossible to know whether the actual bearing inspection measurements accurately reflect bearing performance after installation. Finally, qualification of large production lots typically requires testing of up to ten percent of all bearings produced. In practice, since the testing requires extensive manual measurements of various dimensions, production lot testing adds a significant amount of time and expense to production of the bearings.

A need therefore exists in industry for an inspection gauge that may be formed in a simple and versatile manner to provide reliable, efficient and cost-effective inspection of molded components. There further exists a need for a gage that is capable of simulating the intended environment for the molded component being inspected, thereby allowing a random sampling to statistically qualify all bearings or bearing sets within a predetermined quantity for use without requiring inspection of every bearing or bearing set.

SUMMARY OF THE INVENTION

The invention is directed to both a gage device and a test system for statistically qualifying compliant or semi-rigid molded bearings and bearing sets to predetermined material conditions prior to assembly (i.e. at beginning of life conditions). The invention includes a gage body, a flanged plug, adapters to set maximum and minimum of material conditions, bearings or bearing sets, studs to set maximum and minimum material conditions, and a test fixture. A bearing or bearing set is assembled to a lower portion of a stud, where the stud is chosen to provide a first material condition. The bearing/stud assembly is then received within at least one adapter chosen to provide a second predetermined material condition. The adapter, including the bearing and stud, is received within a gage body, and a flanged plug is threaded into the gage body. By tightening or loosening the plug, the plug may exert a known force both radially and axially on the bearing set between the adapter and the stud. If the plug flange is not able to seat against the gage body within predetermined torque values, then the bearing set is determined to be defective for failing to install compatibly within the cage. If desired, a test fixture is attached to the upper portion of the stud and the stud is rotated through a predetermined torque cycle and through a predetermined load cycle. The test fixture is used to cyclically load the assembly and to measure axial end motion of the assembly against minimum end motion allowed by applicable specifications. Therefore, during the axial loading cycle, at least one measuring device records the axial end motion or "play" within the assembly. The recorded axial motion must comply with pre determined minimum end motion requirements for the bearing or bearing set at the predetermined load cycle; otherwise the bearing or bearing set falls the conformal (functional) test.

A method of statistically qualifying conformal or compliant bearings is also disclosed whereby accepted statistical methods are applied to a production lot for acceptance testing. In particular, a predetermined number of bearing, or bearing sets within a production lot may be tested to ensure that an entire production lot is acceptable for use. In this way, functional acceptability of a given number of samples drawn from a production lot is proven to satisfy pre-determined maximum and minimum material conditions.

The bearing gage assembly of the present invention does not provide dimensional testing per se, but rather provides a PASS/FAIL test methodology for qualifying conformal or compliant bearing production. The device simulates the assembly of ball joints to determine whether molded conformal bearings or bearing sets are acceptable from a beginning of life perspective. Additional features allow the required crease flow through the bearings to be checked under varying load conditions. Moreover, the gage assembly of the present invention may serve as a check on any dimensional adjustments made in the production process, thereby insuring proper "fit" of any modified bearing or bearing set. The gage of the present invention may also substitute statistical qualifying for traditional time-consuming manual inspection regimes. In this way, functional acceptability of a given number of samples drawn from a production lot is proven to satisfy pre-determined maximum and minimum material conditions.

BRIEF DESCRIPTION C)F THE DRAWINGS

The features and inventive aspects of the present invention will become more apparent upon reading the following detailed description, claims, and drawings, of which the following is a brief description:

DETAILED DESCRIPTION OF PREFERRED EMBODIMENT

Figures 1, 2:
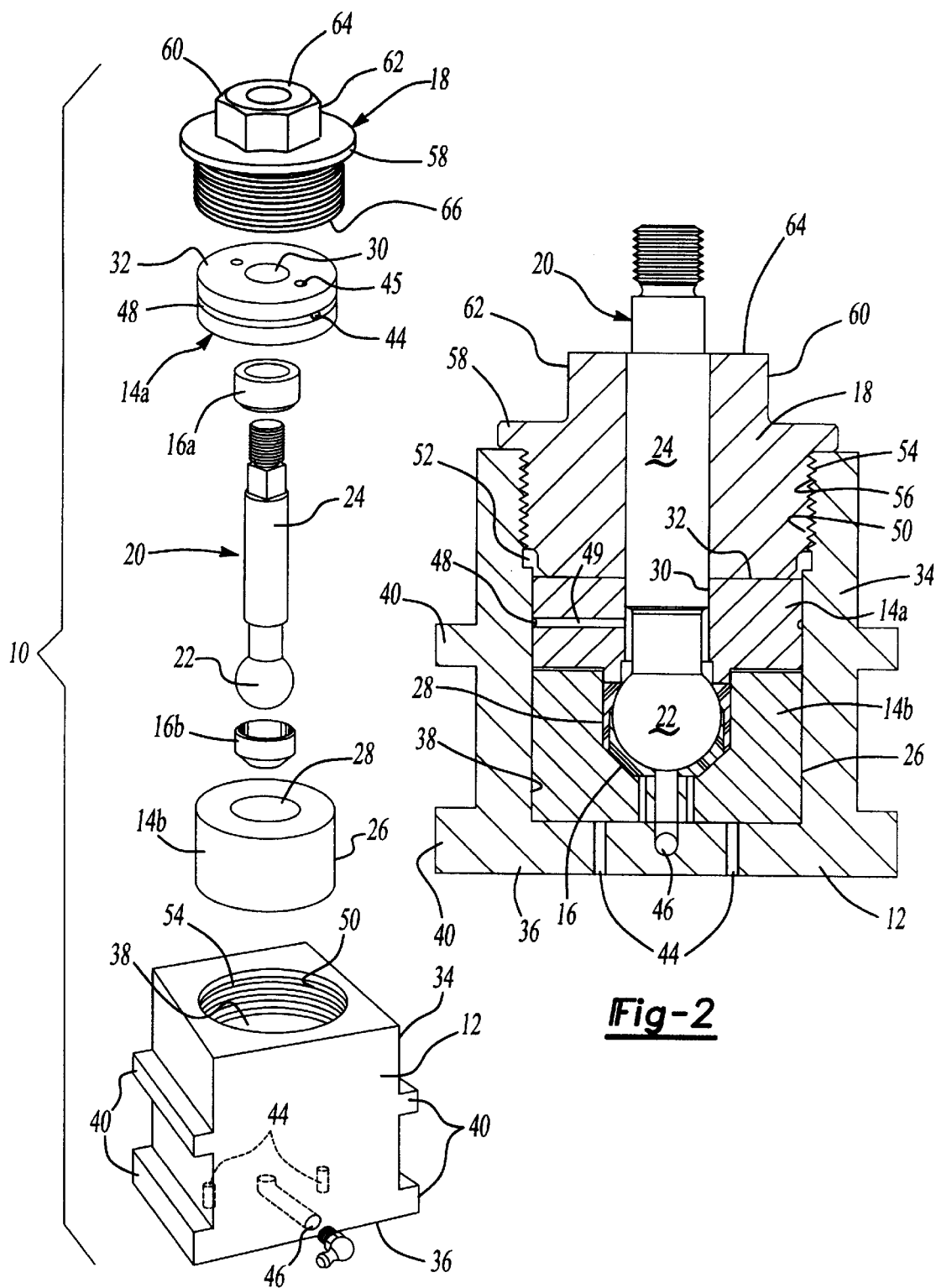
FIG. 1 is an exploded view of a first embodiment of a conformal bearing gage according to the present invention.
FIG. 2 is a perspective view of the gage body according to the present invention.

For purposes of the following discussion, a gage assembly 10 will be described generally with reference to FIGS. 1 and 2. The gage assembly 10 includes a body 12, at least one adapter 14, at least one bearing 16, a plug 18 and a stud 20. According to the present invention, the bearing 16 is first preassembled to a stud lower portion 22. The bearing 16 may include more than one piece, as for example, a bearing set wherein one bearing is attached to the bottom of the stud head 22 and a second bearing is fitted over a stud upper portion 24 (see e.g. bearing sets 16a and 16b of FIGS. 1 and 2 and bearing sets 16' and 16" of FIGS. 3a and 3b, respectively). It should be understood that single-piece bearings and multiple piece bearing sets are interchangeable in the following description. However, for the purposes of the following description, operation will be described only with respect to a single-piece bearing 16. The adapter 14 is next placed around the bearing/stud assembly. As with the bearings 16, the adapter 14 may include more than one piece (see e.g. adapters 14a and 14b in FIGS. 1 and 2). Once the adapter 14 is assembled to the bearing/stud assembly, the bearing 16, stud 20 and adapter 14 are all placed within the gage body 12. The plug 18 is attached to the gage body 12, thereby securely fixing the bearing 16, stud 20 and adapter 14 within the gage body 12. The gage body 12 is then secured in place and the bearing 16 is subjected to a test cycle.

Figure 3A:
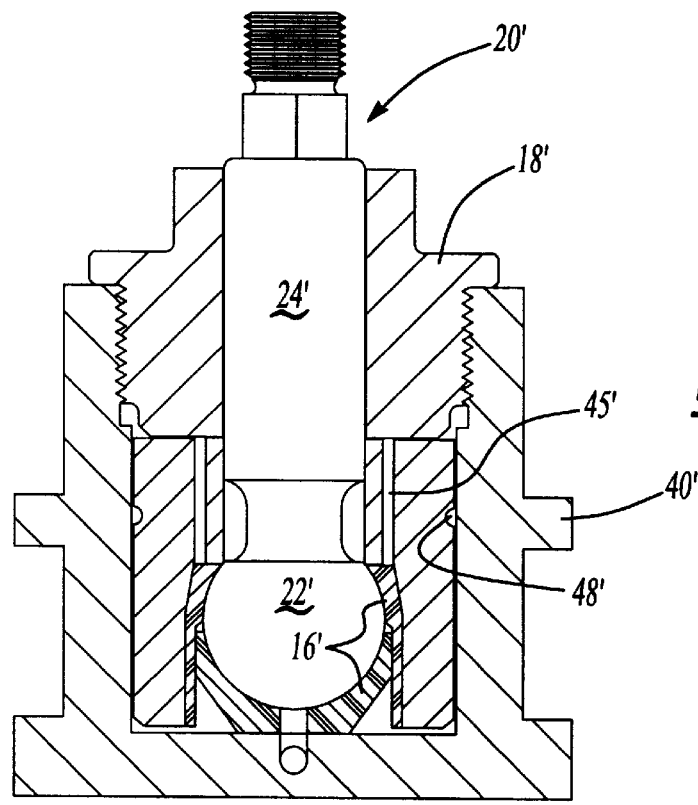
FIGS. 3a and 3b are side views of various other embodiments of the present invention.
Figure 3B:
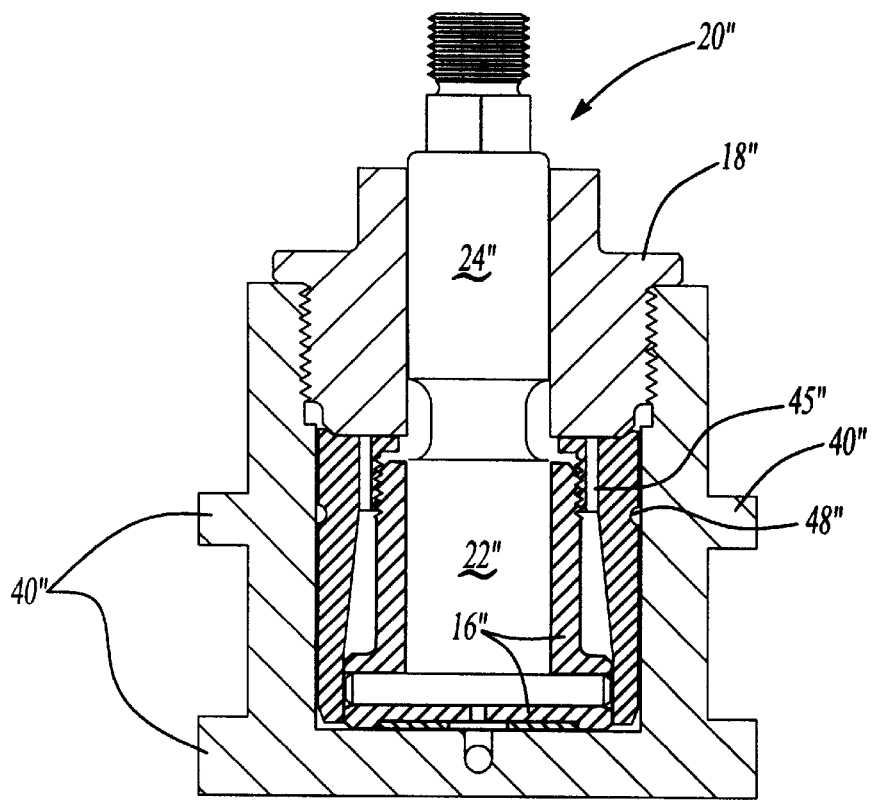

Examples of different shapes of stud 20' and 20" are shown in FIGS. 3a and 3b. However, the stud 20 may be of any standard design used in vehicular ball and socket joints, non-articulating joints and similar industrial applications. For simplicity, the following description will refer to the standard ball stud 20 shown in FIGS. 1 and 2.

The stud 20 includes a lower portion 22 and an upper portion 24. While the upper portion 24 preferably defines a standard sized stem, the size and shape of the stud head 22 is preselected for size, and may be used to exert an initial material condition on the bearing 16 when the bearing and stud head 22 are inserted into the adapter 14. Specifically, the stud head 22 may be intentionally larger or smaller than that normally used in conjunction with a particular bearing 16. If the stud head 22 is larger than normal, then the bearing 16 will be compressed when the bearing 16 and the stud head 22 are inserted the adapter 14, and will be forced to conform to a larger stud head area. Similarly, if the stud head 22 is smaller than normal, then more play will be introduced into the gage assembly 10. Thus, the stud head 22 may be varied to test maximum and minimum initial operating material conditions of a particular bearing 16.

Similarly, the size and shape of the adapter 14 may be varied to impose second preselected maximum and/or minimum material conditions on the bearing set. The adapter 14 generally is comprised of an annular fitting that presents a generally cylindrical exterior surface 26. The adapter 14 further defines a cavity 28 for receiving the bearing 16 and stud head 22. In order to accommodate insertion of the stud 20, the adapter includes an opening 30 through the adapter upper surface 32 that is sized to allow the stud upper portion 24 to be slidingly received therethrough, thereby placing the stud head 22 and bearing 16 within the cavity 28. Of course, the shape of the cavity 28 will vary with the shape of the stud head 22 (see FIGS. 3a and 3b). Likewise, the size and shape of the cavity 28 may be varied to provide either greater or less compression of the bearing 16 when the bearing 16 and the stud head 22 are received within the cavity. Thus, the combined size and shape of both the stud head 22 and the adapter cavity 28 may be closely controlled to set first and second initial material conditions. In practice, varying the size and shape of either or both of the stud head 22 and the adapter cavity 28 can produce virtually any initial condition on the bearing 16, and may likewise provide for testing of any type of conformal or compliant bearing or bearing set 16.

Once the bearing 16 has been installed on the preselected stud head 22 and the resulting assembly has been inserted into the adapter 14, that adapter 14 is placed within the gage body 12. The gage body 12 is generally cubical in exterior cross-sectional shape with walls 34 and a closed bottom 36. However, the interior perimeter defined by the walls 34 is generally cylindrical in shape, so that the walls 34 define a cylindrical body cavity 38 in the center of the gage body 12 for receiving the stud head 22, the bearing 16 and the adapter 14. The walls 34 are of sufficient thickness to resist axial and radial forces exerted upon them by the adapter 14 and the stud 20. Of course, the gage body 12, and particularly the walls 34, may be formed into any convenient cross-sectional shape, such as square or circular, so long as the body cavity 38 is sized to receive the remaining pieces of the gage 10. The body 12 is shown having a generally square cross-section in FIG. 1.

Likewise, the shape of the body cavity 38 may be formed into any convenient geometric shape designed to accommodate insertion of the adapter 14. As shown in FIG. 1, the body cavity 38 is preferably cylindrical in shape to allow easy insertion and removal of the remaining pieces of the gage assembly 10, and to allow even distribution of loading forces to the gage body walls 34. As best seen in FIG. 2, the gage body 12 further includes formed ribs 40 along the exterior 42 of at least two opposing walls 34. The ribs 40 allow the gage body to be inserted and retained within a vise or other mount for use with a testing fixture, as described in greater detail below. A plurality of small apertures 44 are formed in the gage body bottom 36 to facilitate removal of pieces that become lodged or stuck within the body cavity 38. Similar apertures 45 are formed in the top of the adapter 14. Lastly, the body may be formed with at least one grease channel 46, both for providing grease to the gage assembly 10, and for checking the required grease flow through the bearing. The grease channel 46 is placed through the body side walls 34 at the height of a corresponding groove 48 machined about the outer radial circumference of the adapter 14. The groove 48 communicates with the bearing 16 through a radial hole in the adapter 49. In this way, grease flow through the joint may be easily monitored.

Once the adapter 14, the bearing 16 and the stud 20 are inserted within the body cavity 38, the plug 18 is installed to secure the pieces within the gage body 12. The plug 18 is sized and shaped to fit over the stud upper portion 22 and engage the inner walls 50 of the gage body 12. Preferably, both the upper portion of the gage body inner walls 50 and the lower exterior portion 52 of the plug include corresponding threads 54, 56 for threaded engagement between the plug 18 and the gage body 12. However, the lowermost portion of the plug lower exterior portion 52 includes a radial indentation to provide thread relief, preventing binding or damaging of the threads due to overtightening. The plug 18 also includes a radial flange 58 to prevent over-insertion of the plug 18 into the gage body 12. Additionally, when the flange 58 contacts against the top of the gage body walls 34, the bottom 66 of the plug 18 is in facing contact with the adapter upper surface 32, providing a compressive force thereon. Thus, when the plug 18 is fully inserted into the body 12, the bearing 16 is fully seated between the stud head 22 and the adapter 14. Finally, the plug 18 is formed with an adjustment feature 60 that allows the plug 18 to be tightened or loosened to increase or decrease the initial pressure on the bearing 16. Preferably, the adjustment feature is provided by forming a hexagonal shoulder 62 adjacent to the top surface 64 of the plug 1 8. If the hexagonal shoulder is formed of a standard size, a wrench or other adjustment tool may be used to tighten or loosen the plug 18. Moreover, through application of a torque wrench, the amount of load exerted upon the bearing 16 may be precisely controlled, and increased or decreased easily.

The gage assembly of the present invention is intended to be used in a PASS/FAIL regime. Generally, for a bearing to pass inspection, the bearing must first install correctly in the gage assembly. If desired, the bearing or bearing set 16 must also meet the minimum axial end movement allowed by specifications during a test cycle in order to pass. If any of the requirements are not met, then the bearing 16 fails.

Figure 3:
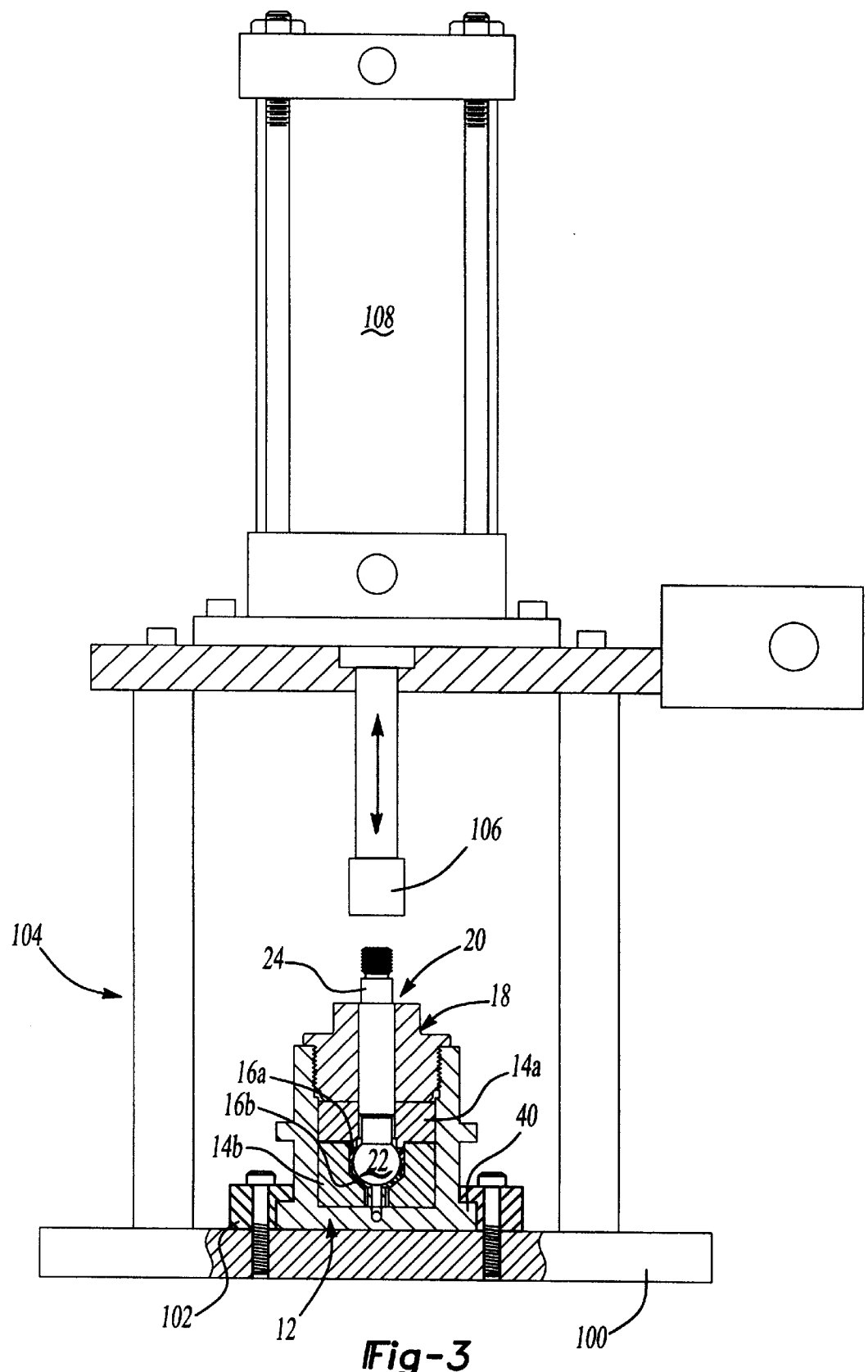
FIG. 3 is a side view of a side view of the bearing gage and test fixture of the present invention.

Testing of the bearing gage assembly 10 of the present invention is shown with reference to FIG. 3. The gage body 12 is secured down to a table 100 using conventional means such as a vise 102, which is facilitated by the ribs 40 formed on the exterior of the body 12. The plug 18 is then tightened or loosened, preferably by applying a torque wrench to the hexagonal shoulder 62 on the plug 18. Application of the torque wrench obtains a desired minimum or maximum stud rotating torque requirement for the test. Once the desired torque requirement is obtained, the stud upper portion 24 is attached to a test fixture 104 using conventional means. The stud upper portion 24 is coupled to the test fixture piston 106, which is preferably connected to a hydraulic or pneumatic cylinder 108. After installation of at least one indicating device, such as a dial indicator, the test fixture cycles the stud 20 through a predetermined test routine that normally includes both tension and compression. By cycling the stud, the bearing 16 is tested under conditions that approximate beginning of life conditions while the indicating device monitors the amount of end "play" allowed by the bearing 16 for compliance with pre-established test requirements. In this way, the bearing 16 is evaluated for compliance with applicable specifications. For example, the loading normally applied is between 100 and 4000 lbs (45.4 to 1814.4 kgs), and a cycle may include testing from 200 lbs (90.7 kgs) tension through 1200 lbs (544.3 kgs) compression. However, other applicable loading criteria may also be used. During the cycling of the test fixture, the grease flow through the bearing set under load may also be visually checked for excess grease flowing out of the grease channel 46.

The gage assembly 10 of the present invention is also useful for qualifying and inspecting bearing production lots rapidly. Moreover, during the tooling stage, the gage assembly may be used to ensure that useful bearings are being produced. Instead of manually inspecting the dimensional characteristics of the bearings, the gage assembly of the present invention provides a method for testing bearings that may be used in conjunction with well-known statistical sampling methods to qualify an entire lot of bearings. According to the inventive method, a statistical sampling method is first chosen that defines the number of bearings or bearing sets to functionally test. Once the number of functional tests is identified, that number of bearings or bearing sets is randomly chosen from a given production lot. In each test, the bearing 16 is greased and installed as described above, and is tested on the test fixture 104. Depending upon the statistical sampling method used, a predetermined number of bearings or bearing sets 16 from a production lot must pass for an entire production lot to qualify.

Importantly, the gage assembly 10 of the present invention may also be used to facilitate correction of bearing production and may even be used to qualify production tooling. In both instances, the gage assembly 10 provides a quick and readily available method for checking production and moulding capability against design specifications. Thus, inspection and qualification of bearing production lots is greatly streamlined and simplified. Bearing production and tooling time may be significantly shortened, thereby decreasing the time required to market the ball and socket joints. Moreover, production lots approved by the testing methods are known to fit, and in fact, malt be approved even before all components of a full ball and socket joint assembly are even available.

Preferred embodiments of the present invention have been disclosed. A person of ordinary skill in the art would realize, however, th-at certain modifications would come within the teachings of this invention. Therefore, the following claims should be studied to determine the true scope and content of the invention.

What is claimed is:

1. A gage assembly suitable for inspecting a fitting, the gage assembly comprising:
   a stud having upper and lower portions, said stud preselected to establish a first predetermined material condition when the fitting is assembled to said lower portion of said stud;
   a generally cylindrical annular adapter, said adapter defining a first cavity for receiving the fitting and stud lower portion and a hole for receiving said stud upper portion;
   a gage body having side walls and a bottom wall, said side walls defining a second cavity for receiving said adapter, an upper inner portion of said body including a first attachment; and
   a flanged plug having an aperture therethrough to receive said upper portion of said stud, an exterior portion of said flanged plug defining a second attachment for engaging said first attachment on said gage body whereby said flanged plug selectively secures said stud, the fitting and said adapter within said gage body.

2. The gage assembly of claim 1, wherein an upper portion of said adapter facingly engages a lower surface of said plug when said plug is attached to said body.

3. The gage assembly of claim 1, wherein said flanged plug defines an annular collar sized to contact a top of gage body said side walls to prevent over-insertion of said flanged plug into said body.

4. The gage assembly of claim 1, wherein said first and second attachments arc threaded to selectively mate with each other.

5. The gage assembly of claim 4, wherein said plug further includes an adjustment feature for adjusting the initial pressure exerted on the fitting.

6. The gage assembly of claim 5, wherein said adjustment feature comprises a hex-shaped upper portion of said plug.

7. The gage assembly of claim 4, wherein said flanged plug further includes an adjustment feature.

8. The gage assembly of claim 5, wherein said adjustment feature comprises a hex-shaped upper portion of said flanged plug.

9. The gage assembly of claim 1, wherein said gage body includes a plurality of small apertures in said bottom wall to facilitate removal of pieces lodged within said second cavity.

10. The gage assembly of claim 1, wherein said adapter includes a groove about an exterior surface thereof, said groove in communication with an exterior surface of the fitting, said gage body further including at least one grease flow channel through said side walls in communication with said groove.

11. The gage assembly of claim 1, wherein said body includes slotted ribs on an exterior surface thereof.

12. The gage assembly of claim 1, wherein said adapter is preselected to establish a second predetermined material condition.

13. The gage assembly of claim 1, wherein said first and second attachments are threads.

14. The gage assembly of claim 1, wherein said gage body includes slotted ribs on an exterior surface thereof.

15. A gage assembly suitable for inspecting a ball joint bearing set, the gage assembly comprising:

a stud having upper and lower portions, said stud preselected to establish a first predetermined material condition;

a bearing set adapted to receive and be assembled to said lower portion of said stud;

a generally cylindrical generally cylindrical annular adapter, said adapter defining a first cavity for receiving said bearing set and stud lower portion and a hole for receiving said stud upper portion, wherein said adapter is preselected to establish a second predetermined material condition;

a generally annular gage body having annular side walls and a bottom wall, said side walls defining a second cavity for receiving said insert, an upper inner portion of said body including a first attachment; and a generally cylindrical annular flanged plug having an aperture therethrough to receive said upper portion of said stud, an exterior portion of said flanged plug defining a second attachment for engaging said first attachment on said gage body whereby said plug secures said stud, said bearing set and said adapter within said gage body and wherein said flanged plug defines an annular collar sized to contact a top of said side walls to prevent over-insertion of said flanged plug into said body.

16. A method for testing a ball joint bearing set, comprising:

selecting a bearing set to be tested;

assembling said bearing set to a lower portion of a stud member, said stud member further defining an upper portion, wherein said stud member lower portion is preselected to establish a first predetermined material condition;

inserting said stud member upper portion through an annular generally cylindrical adapter such that said bearing set and said stud lower portion are received within a cavity defined in said adapter;

assembling said adapter, bearing set and stud lower portion to a gage body, said gage body including a bottom wall and side walls axially extending from said bottom wall to define a second cavity sized to receive said adapter;

attaching a plug to said gage body, said plug including a hole therethrough for receiving said stud upper portion such that a lower surface of said plug contacts an upper surface of said adapter;

adjusting said plug to exert a predetermined load upon said bearing set; and examining said gage to determine if the bearing set is acceptable.

17. The method of claim 16, further comprising the steps of:

securing said gage body to a work table;

attaching a test fixture to said stud upper portion;

installing at least one indicating device against said stud upper portion;

cycling said test fixture through a predetermined load cycle; and monitoring said at least one indicating device for compliance with pre-established test requirements to determine if the bearing set is acceptable.

18. The method of claim 16, wherein said selecting step comprises:

choosing a statistical sampling method that defines a number of bearing sets to functionally test; and selecting said number of bearing sets from a given production lot.

\* \* \* \* \*

UNITED STATES PATENT AND TRADEMARK OFFICE
CERTIFICATE OF CORRECTION

PATENT NO.    : 6,298,570 B1  
DATED         : October 9, 2001  
INVENTOR(S)   : Garth Maughan et al.

It is certified that error appears in the above-identified patent and that said Letters Patent is hereby corrected as shown below:

<u>Column 6,</u>  
Line 41, replace "a top gage" with -- a top of said gage --.  
Line 42, replace "body said side walls" with -- body side walls --.

Signed and Sealed this

Second Day of April, 2002

Attest:

Attesting Officer

JAMES E. ROGAN  
*Director of the United States Patent and Trademark Office*